March 30, 1937. A. E. F. VAN CANEGHEM 2,075,785
MOTORCYCLE
Filed Feb. 8, 1936
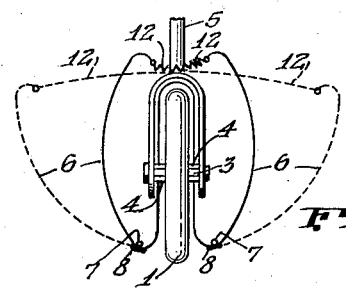
Fig. 1
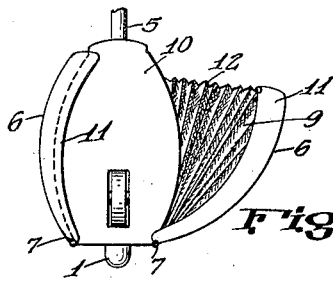
Fig. 2
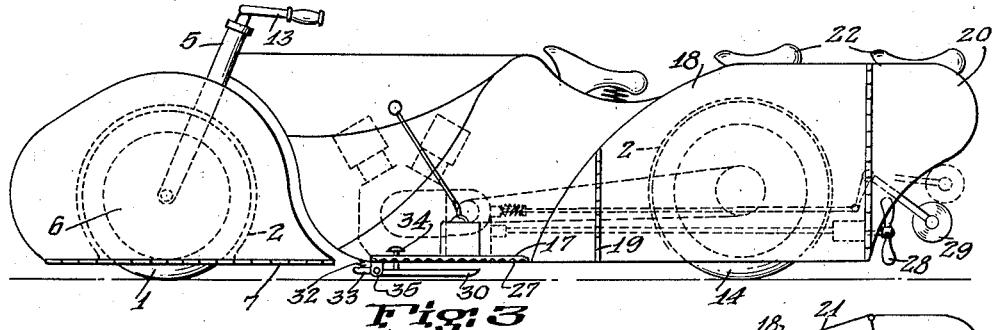
Fig. 3
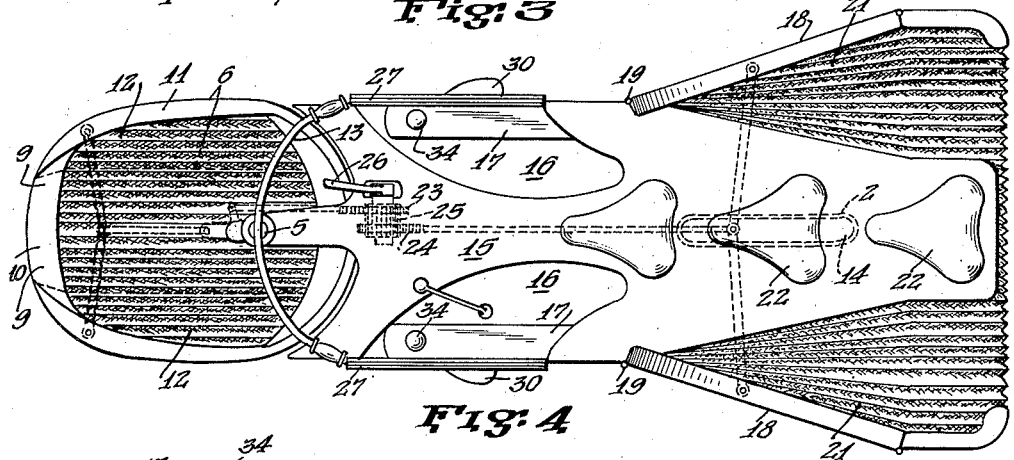
Fig. 4
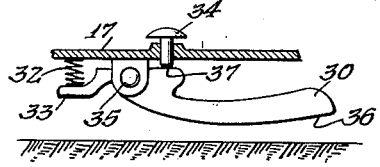
Fig. 5
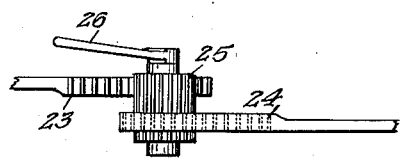
Fig. 6
Fig. 7
INVENTOR.
Van Achilles Caneghem
BY
ATTORNEY.

Patented Mar. 30, 1937

2,075,785

UNITED STATES PATENT OFFICE 2,075,785

MOTORCYCLE

Achilles Eduard Freiherr van Caneghem, Berlin-Halensee, Germany

Application February 8, 1936, Serial No. 62,917
In the Netherlands December 16, 1935

6 Claims. (Cl. 115—1)

The invention relates to a motor cycle which can be used as a water craft, and consists in providing an ordinary motor cycle with a casing which does not impede the running of the cycle on land and serves when on land merely as a mudguard, while acting as a floating body when travelling in water.

In particular the invention is embodied in such a manner that the front wheel and its covering on the one hand, and the frame engine, rear wheel and covering on the other hand, form independent units, so that, when running on land, the front wheel can be steered in the usual manner, whereas when in water the front wheel and covering form a floating body, in combination with the covering of the rear part of the cycle. With this object the covering of the front wheel is designed to fit over the wheel like a trough, the opening at the top of the trough being fitted with a cover for protection against dust and rain. For use on land the cover folds up concertina-fashion, so that when on water it forms a cover—similar to the deck of a boat—for the two portions of the trough which are swung out laterally. This collapsible form of front wheel covering is desirable in order that, when on land, the front wheel shall not take up much more room laterally than in the case of an ordinary motor cycle.

Round the engine the covering for the rear part of the motor is recessed to accommodate the legs of the rider, from the saddle down to the foot rests, while in the vicinity of the rear wheel the covering is provided with a gradually tapering advantageously arched covering. This rear covering however is adapted to swing out laterally, so that in the arched cover the rear walls of the covering are hinged to the foot rests near the saddle on the one hand, while on the other hand their rear parts are mounted so that they can be extended transversely over a suitable spreader. Said spreader may consist of a telescopic cross bar, or rack mechanism or other suitable actuating means, operated advantageously by a handle mounted near the usual starting lever. The middle part of the covering fits around the rear wheel as in the case of the front wheel covering so as to surround the wheel after the manner of a shaft. In this way, the covering can be made watertight in a simple and reliable manner, so that the hubs of both wheels enter the interior of the covering only through two stuffing boxes in each case.

To protect the cyclist, as well as the passengers, from getting wet when on the water, it is advantageous to provide coverings of the nature of Venetian blinds, these coverings being spread only for travelling on water. These coverings may be placed beside or under the foot rests (running boards) when on land.

When the machine is used as a water cycle the steering is effected by means of the front wheel or its covering.

When used as a water craft the machine is advantageously driven by means of a propeller, which may either be permanently secured to the frame, or attachable thereto.

Another important feature is the provision of supporting or braking members for use when the machine is running at low speed, or is standing still.

The invention is diagrammatically illustrated by way of example in the accompanying drawing.

Figure 1 is a cross section of the covering of the front wheel, with the front wheel shown in elevation.

Figure 2 is a front elevation of the motor cycle, showing the trough-shaped front wheel covering partly closed and partly open.

Figure 3 is a side elevation of the motor cycle.

Figure 4 is a plan corresponding to Figure 3, with the coverings in opened position.

Figure 5 shows the supporting and guide blocks, with the pedals.

Figure 6 is a partial view of the spreading mechanism for extending and collapsing the floats associated with the front and rear wheels.

Figure 7 is a side elevation of the mechanism according to Figure 6.

Referring to the drawing, there is shown a motor cycle comprising the usual front and rear wheel units associated with a main frame carrying a driving motor and the necessary transmission mechanism therebetween and the rear wheel. A covering 2 is slipped, like a shell, over the front wheel 1 of the motor cycle (Figures 1 and 2), the hubs 3 passing through stuffing boxes 4 in the covering 2. The front wheel steering column 5 may be of the usual construction. Attached to the covering 2 on both sides of the wheel 1 are walls 6, mounted on the lower ends of the covering 2 by means of hinges or the like 7. The inner walls 2 and the outer walls 6 together form a watertight trough. Sealing means 8 may be provided around the hinges 7. In order to prevent access of water when the walls 6 are opened out, the walls 6 are connected, by means of watertight material 9, to the front and rear coverings 10, which are secured to the front part 5 of the frame. The walls 6 advantageously engage round the front and rear walls 10 by means of flanges 11. When the trough 2, 6 is closed the watertight material or the like 9 collapses, concertina-fashion. The upper opening 5 of the trough 2, 6 can be closed in similar manner by a cover 12, so that a boat hull is formed around the front wheel when the machine is used as a water craft. In such case, there is no objection to the two troughs being opened beyond the handle bars 13.

The rear portion of the motor cycle is completely encased in a similar manner, whereby both the engine and the rear wheel are protected against the access of water. The covering fits around the rear wheel 14 like a shell, similar to that shown in Figure 1. Near the driver's legs the rear part of the covering 15 is recessed at 16 on both sides, as shown in Figures 3 and 4.

Since the width of the motor cycle is fixed by the two foot-rests 17, the rear portions of the covering can be attached to said foot-rests and preferably converge to lock together behind the wheel 14. When open, the rear covering 18 may be spread out to any convenient extent, for which purpose the rear covering 18 is attached to the front part of the covering 15 by means of hinges 19. In the extended position the covering 18 forms, with its rear walls 20, two side pockets or two seats 21.

The coverings can be opened out and drawn together by means of any convenient actuating system, an example of which is represented by the rack mechanism shown in Figures 6 and 7. A rack 23 engages with a spreading mechanism for the front unit as shown in Figure 4, and a second rack 24 engages with the other covering 18''. Between the two racks 23 and 24 is a pinion 25, mounted in a fixed position and actuated—advantageously through transmission mechanism—by a lever 26. In the collapsed position of the seats 21 the rear wall 20 folds up like a bellows, as shown in Figure 4. A folding apron 27 is provided beside or below the foot rests 17, to protect the driver from the water, and also to increase the displacement of the machine when used on the water.

When the machine is used as a water craft it is driven by a propeller 28 driven by the engine. The change-over is advantageously effected by means of a change gear, and the original position can be obtained by means of a float 29, which rises when the machine enters the water, and thereby directly, or indirectly, changes the drive. On land the float 29 may serve as a bumper and when in the water may also be employed as a control device in connection with the other necessary changes.

According to Figure 5 rests provided as guide-, brake- and supporting-blocks 30 are located beside or below the foot rests 17. The blocks 30 are pivotally mounted in brackets 31 attached to the foot rests 17. By means of a spring 32, which engages a lever 33 forming an extension of the block 30, the latter is kept pressed upwards, and therefore pushed in the direction of the foot rests 17. For the purpose of actuating the block 30 a pedal 34 is mounted on or in the foot rest 17 and, on being depressed, positively forces the block 30 downward. Since the leverage ratio between the block pivot 35, the bearing surface 36 of the block, and the point of application 37 of the pedal may be selected as convenient, the pressing forces of the pedal, the time occupied in depressing, and the distance traversed by the block per unit of time when depressed can be varied as desired.

I claim:—

1. In a motor cycle, in combination, a rear unit comprising a frame, a motor, a rear wheel driven from said motor, a rear covering system provided to form a collapsible floating body and to prevent said motor and the driver from dipping into the water when in floating condition, a front unit movably connected to said rear unit and comprising a steering frame, a steering wheel, a steering handle and a front covering system arranged to form a collapsible floating body and to act as a rudder when in floating condition, means adapted to adjust said coverings to two extreme positions, said coverings having minimum volume and minimum air resistance in one position and maximum volume and maximum buoyancy in the other position, each of said covering systems comprising two rigid members hingedly connected at their lower edge with the lower portion of the respective units at both sides thereof, and adapted to swing out laterally to an extreme position, flexible members watertightly connected with the free edges of said rigid members and said units and forming concertina-fashion collapsible water-tight floats together with said rigid members and said units.

2. In a motor cycle, in combination, a rear unit comprising a frame, a motor, a rear wheel driven from said motor, a rear covering system arranged to form a collapsible floating body and to prevent said motor and the driver from dipping into the water when in floating condition, a front unit movably connected to said rear unit and comprising a steering frame, a steering wheel, a steering handle and a front covering system provided to form a collapsible floating body and to act as a rudder when in floating condition, means adapted to adjust said coverings to two extreme positions, said coverings having minimum volume and minimum air resistance in one position and maximum volume and maximum buoyancy in the other position, each of said covering systems comprising two rigid members hingedly connected at their lower edge with the lower portion of the respective units at both sides thereof and adapted to swing out laterally to an extreme position, flexible members watertightly connected with the free edges of said rigid members and said units and forming concertina-fashion collapsible water-tight floats together with said rigid members and said units, said rear covering system forming a shaft air-tightly enclosing said rear wheel from above and laterally.

3. In a motor cycle, in combination, a rear unit comprising a frame, a motor, a rear wheel driven from said motor, a rear covering system arranged to form a colllapsible floating body and to prevent said motor and the driver from dipping into the water when in floating condition, a front unit movably connected to said rear unit and comprising a steering frame, a steering wheel, a steering handle and a front covering system provided to form a collapsible floating body and to act as a rudder when in floating condition, means for adjusting said coverings to two extreme positions, said coverings having minimum volume and minimum air resistance in one position and maximum volume and maximum buoyancy in the other position, each of said covering systems comprising two rigid members hingedly connected at their lower edge with the lower portion of the respective units at both sides thereof and adapted to swing out laterally to an extreme position, flexible members water-tightly connected with the free edges of said rigid members and said units and forming concertina-fashion collapsible water-tight floats together with said rigid members and said units, said rear covering system being recessed, in the vicinity of said motor, for accommodating the driver's feet and forming a rounded junction behind said rear wheel.

4. In a motor cycle, in combination, a rear unit comprising a frame, a motor, a rear wheel driven from said motor, a rear covering system arranged to form a collapsible floating body and to prevent said motor and the driver from dipping into the water when in floating condition, a front unit movably connected to said rear unit and comprising a steering frame, a steering wheel, a steering handle and a front covering system provided to form a collapsible floating body and to act as a rudder when in floating condition, means for adjusting said coverings to two extreme positions, said coverings having minimum volume and minimum air resistance in one position and maximum volume and maximum buoyancy in the other position, each of said covering systems comprising two rigid members hingedly connected at their lower edge with the lower portion of the respective units at both sides thereof and adapted to swing out laterally of said units to an extreme position, flexible members water-tightly connected with the free edges of said rigid members and with said units and forming concertina-fashion collapsible water-tight floats together with said rigid members and said units, said rear covering system having recesses in the vicinity of said motor, for accommodating the driver's feet, and means for laterally closing said recesses for forming water-tight shafts.

5. In a motor cycle, in combination, a rear unit comprising a frame, a motor, a rear wheel driven from said motor, a rear covering system arranged to form a collapsible floating body and to prevent said motor and the driver from dipping into the water when in floating condition, a front unit movably connected to said rear unit and comprising a steering frame, a steering wheel, a steering handle and a front covering system provided to form a collapsible floating body and to act as a rudder when in floating condition, means for adjusting said coverings to two extreme positions, said coverings having minimum volume and minimum air resistance in one position and maximum volume and maximum buoyancy in the other position, each of said covering systems comprising two rigid members hingedly connected at their lower edge with the lower portion of said units at both sides thereof adapted to swing out laterally of said units to an extreme position, flexible members water-tightly connected with the free edges of said rigid members and with said units and forming concertina-fashion collapsible water-tight floats together with said rigid members and said units, and a propeller for driving said motor cycle when used as a water craft.

6. In a motor cycle, in combination, a rear unit comprising a frame, a motor, a rear wheel driven from said motor, a rear covering system provided to form a collapsible floating body and to prevent said motor and the driver from dipping into the water when in floating condition, a front unit movably connected to said rear unit and comprising a steering frame, a steering wheel, a steering handle and a front covering system arranged to form a collapsible floating body and to act as a rudder when in floating condition, means for adjusting said coverings to two extreme positions, said coverings having minimum volume and minimum air resistance in one position and maximum volume and maximum buoyancy in the other position, each of said covering systems comprising two rigid members hingedly connected at their lower edge with the lower portion of the respective units at both sides thereof and adapted to swing out laterally of said units to an extreme position, flexible members water-tightly connected with the free edges of said rigid members and said units and forming concertina-fashion collapsible water-tight floats together with said rigid members and said units, said adjusting means comprising a rack and pinion mechanism controlling said rigid members.

ACHILLES EDUARD FREIHERR  
VAN CANEGHEM.